United States Patent
Anand et al.

(10) Patent No.: US 9,635,116 B2
(45) Date of Patent: Apr. 25, 2017

(54) TECHNIQUES FOR INFERRING A LOCATION

(71) Applicant: LinkedIn Corporation, Mountain View, CA (US)

(72) Inventors: Sathyanarayan Anand, San Francisco, CA (US); Ganesh Ramesh, Cupertino, CA (US); Alexis Blevins Baird, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 929 days.

(21) Appl. No.: 13/871,570

(22) Filed: Apr. 26, 2013

(65) Prior Publication Data

US 2014/0324964 A1    Oct. 30, 2014

(51) Int. Cl.
*H04L 29/08*    (2006.01)
*G06Q 50/00*    (2012.01)
*G06Q 30/02*    (2012.01)

(52) U.S. Cl.
CPC ......... *H04L 67/22* (2013.01); *G06Q 30/0201* (2013.01); *G06Q 50/01* (2013.01); *H04L 67/18* (2013.01); *H04L 67/306* (2013.01)

(58) Field of Classification Search
CPC ........... G06Q 10/0833; G06Q 30/0261; G06Q 50/01; H04L 67/22; H04L 67/18
See application file for complete search history.

(56) References Cited

U.S. PATENT DOCUMENTS

| | | | |
|---|---|---|---|
| 2010/0094767 A1* | 4/2010 | Miltonberger | G06Q 10/067 705/325 |
| 2012/0110071 A1 | 5/2012 | Zhou et al. | |
| 2013/0185324 A1* | 7/2013 | Bouchard | G06Q 50/30 707/769 |
| 2013/0318077 A1* | 11/2013 | Greenzeiger | G06F 17/30241 707/724 |
| 2014/0143325 A1* | 5/2014 | Lessin | H04L 65/403 709/204 |
| 2014/0156394 A1* | 6/2014 | Argue | G06Q 30/0255 705/14.53 |
| 2015/0127744 A1* | 5/2015 | Moreels | G06Q 10/0833 709/204 |
| 2015/0172327 A1* | 6/2015 | Wansley | G06F 3/04842 715/753 |

* cited by examiner

*Primary Examiner* — Kamal Divecha
*Assistant Examiner* — Charles Murphy
(74) *Attorney, Agent, or Firm* — Schwegman Lundberg & Woessner, P.A.

(57) ABSTRACT

Disclosed in some examples is a method including receiving a plurality of transaction records, each of the transaction records including data about a particular transaction engaged in by a member of a social networking service and including a geographic location and a timestamp of the particular transaction; scoring each of the plurality of transaction records based upon the recency of the transaction; clustering the plurality of transaction records into a plurality of clusters, each cluster including transaction records which contain similar geographic locations; creating an aggregate score for each particular one of the plurality of clusters based upon a sum total of the scores calculated for each transaction record clustered into the particular cluster; and creating a probability distribution based upon the scores for the plurality of clusters, the probability distribution indicating a probability that the member was in each of the plurality of locations represented by the clusters.

21 Claims, 6 Drawing Sheets

TECHNIQUES FOR INFERRING A LOCATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service.

A social networking service is an online service, platform or site that allows members of the service to build or reflect social networks or social relations among its members. Typically, members of the social networking service construct profiles, which may include personal information such as the member's name, contact information, employment information, photographs, personal messages, status information, links to web-related content, blogs, and so on. Generally, only a portion of a members profile may be viewed by the general public, and/or other members.

In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. A connection is generally formed using an invitation process in which one member "invites" a second member to form a link. The second member then has the option of accepting or declining the invitation.

While a social networking service and a business networking service may be generally described in terms of typical use cases (e.g., for personal and business networking respectively), business networking services are commonly used for personal purposes (e.g., connecting with friends, classmates, former classmates, and the like) as well as, or instead of business networking purposes and personal social networking services are commonly used for business networking purposes as well as or in place of personal social networking purposes.

In general, a connection or link represents or is otherwise associated with an information access privilege, such that a first person who has established a connection with a second person is, via the establishment of that connection, authorizing the second person to view or access non-publicly available portions of their profiles which may include communications they have authored (e.g., blog posts, messages, "wall" postings, or the like). Of course, depending on the particular implementation of the business/social networking service, the nature and type of the information that may be shared, as well as the granularity with which the access privileges may be defined to protect certain types of data may vary greatly.

Some social networking services may offer a subscription or following model instead of, or in addition to, the connection model. A subscription or following model is where one member "follows" another member without mutual agreement. Typically in this model, the follower is notified of public messages and other communications posted by the member that is followed. An example of a social networking service that follows this model is Twitter, a micro-blogging service that allows members to follow other members without explicit permission.

While most social networking services allow members to self-specify their home or work locations as part of their member profiles, members are not always diligent in updating their member profiles to reflect changes in their home and work locations, and many social networks do not presently have the ability to determine whether or not the location in the member profile is still accurate. As a result, member interactions with the service that are tailored or specific to a location may not be relevant to members.

Disclosed in some examples are systems, methods, and machine-readable mediums which enable a social networking service to infer geographic locations of a member by using transaction information the social networking service automatically learns about the member. These inferred locations may be used in a variety of ways by the social networking service. Examples include suggesting that the member update their profiles, determining that the member is a traveler and providing personalization based upon that classification, and detecting fraudulent login attempts.

A transaction may include any interaction or event between the member and the social networking service or between the member and another network based service that may provide an indication of a member's location. Information about each transaction may be collected and stored in a transaction record which may include a geographic location of the transaction, timestamp of the transaction, and type of transaction.

After a predetermined period of time (or in some examples, a predetermined number of records are collected) the social networking service may retrieve the transaction records from storage. The social networking service may clean the transaction records using appropriate data cleaning techniques. The records may then be scored based in whole or in part upon how recent the transaction took place (more recent transactions may be weighted more heavily—e.g., a time decay algorithm is used to weight the contribution of any transaction or event based upon when it occurred). The social networking service may then cluster the transaction records so that transaction records with similar geographic locations are clustered together. For example, locations within a predetermined geographical radius from each other, or from a particular geographical location (e.g., any transaction within 100 miles of San Francisco) may be clustered together. Low scoring location clusters may be removed, and the scores may be normalized to create a probability distribution for each location that indicates the probability that, based upon the transaction records collected, the member is in that geographic location. In some examples, the probability distributions may be smoothed out such that even locations without an observed transaction have some small non-zero probability that the member may be located there. These calculations may be repeated periodically by the social networking service to account for newly observed transactions, and the social networking service may observe the location probabilities over time to determine changes in the probabilities. These changes may inform the social networking service about various location habits of the member. For example, depending upon the nature of the probability distribution for a particular member, the social networking service may determine that the member has likely moved, is a traveler, or that someone attempting to login to the member's account is logging in from a location that is not likely a location that the member would be in and therefore could be fraudulent.

While individual transactions may be representative of a member's instantaneous location (e.g., an exact position of a member at a particular time), the disclosed method may utilize those instantaneous locations to infer a non-instantaneous location status of the member (e.g., a general location where the member frequently locates in—for example, the member lives or works in a given location or locations and/or travels frequently). Additionally, while the transactions may be explicit indicators of location (e.g., the transactions contain explicit geographic locations such as latitude and longitude coordinates or a particular geographic location), the transactions may also be implicit indicators of location such that they contain information leading to a physical geographic location. For example, an IP address associated with the social networking service may not in itself contain an explicit location, but may be converted using a database or other method to a physical geographical location.

Figure 1:
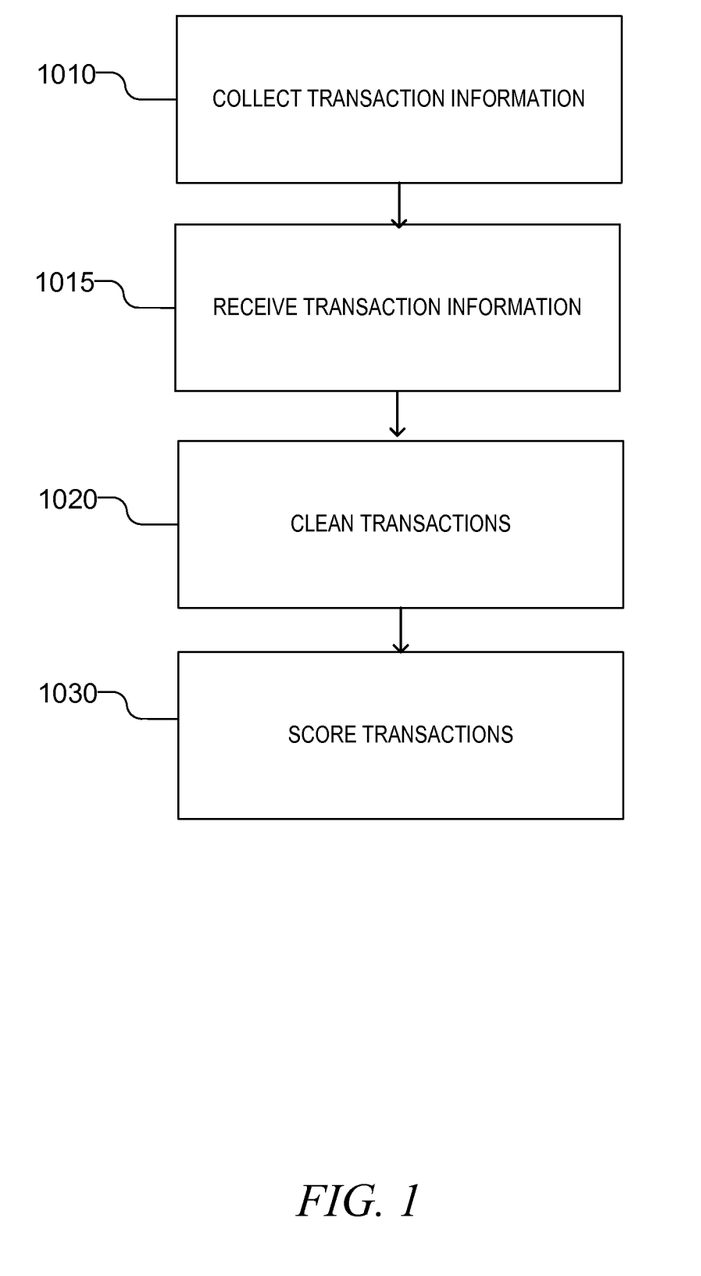
FIG. 1 shows a method of inferring a location according to some examples of the present disclosure.

Turning now to FIG. 1, a method of inferring a location according to some examples is shown. At 1010 the social networking service may collect information on transactions involving the member. Example transactions may include, but are not limited to:

Member use of the social networking service (e.g., an IP address used by the member to access the social networking service may be converted to a location using a mapping database which maps IP addresses to geographic locations);

Instances in which a member shares a particular news or other article that describes events in a particular location (the social networking service may infer the member is in a particular location based upon interest in that location);

Interactions with location specific advertisements (the social networking service may infer the member is in a particular location based upon interest in that location);

Information provided from other network based services such as FourSquare check ins (Foursquare is a location based networking website where users 'check-in' at venues using various methods and is run by Foursqaure Labs, Inc., of New York City, N.Y.);

Global Positioning System data obtained from computing devices of the user (e.g., a mobile app that accesses the social networking service);

Connections with other members—a member who connects with another member in a particular location is more likely to be in the location of the member they connected with. The location of the member they connected with may be determined based upon that member's profile or one or more of that member's inferred locations (e.g., if that member has high probabilities of being in three locations, the probability that the connecting member is in those three locations may increase as well). This is especially true for new connections as a member who has moved is likely to make new connections in their new location and as such these signals may be very powerful.

A location reported by the member in his or her profile as a home or work location.

A location associated with a company that the member reports that they work for.

Information about the transaction may be stored in a data store as one or more transaction records. The information may be gathered based upon logs of a member's activity on the social networking service, or based upon scraping other network based services or websites which may be explicitly or implicitly associated with the member. For example, a member may inform the social networking service about a Twitter account that they own. The social networking service may scrape the Twitter account and use text analysis to determine Tweets that refer to particular locations. As another example, a member may inform the social networking service about a Foursquare account they own. The social networking service may scrape the account for "check ins" at various locations. In addition to, or instead of scraping, the social networking service may utilize one or more application programming interfaces (API) of the other network based services in order to obtain this information. The social networking service may contact the other networking service over a computer network and request the information using the API. In some examples, the member may provide the social networking service with authorization to contact the other networking service. For example the member may provide a username/password or other credentials.

At 1015 this data may be periodically retrieved from storage (or gathered if necessary) for processing. At operation 1020 the transaction information may be cleaned before further processing. For example, the social networking service may detect corporate IP addresses and virtual private networks and remove transactions with these addresses from consideration or reduce their weighting. This is because corporate IP addresses and IP addresses behind VPNs (Virtual Private Networks) are sometimes less reliable predictors of geographical location as the actual computing device utilizing the IP address may not be in close proximity to the actual physical location mapped to the IP address. In some examples, the IP address may be determined to be a corporate IP address or VPN based upon a determination that multiple members of the social networking service all report on their member profiles that they work for the same company and all are using the same (or similar) IP address during working hours. This may enable the social networking service to estimate with a high degree of confidence that the given IP address belongs to a corporation or is behind a VPN. In some examples, if auxiliary information regarding the physical location of the corporation's offices is available, that information may be utilized instead of the IP address information (i.e., instead of purging the transaction completely). Other cleaning methods including removing from consideration IP addresses that do not map to known locations (e.g., the IP to geo lookup database does not contain geo lookups for these IPs.).

At operation 1030 the transactions may be scored. In some examples, each recorded transaction may be assigned a base point value. This base point value may then be multiplied by a weighting factor selected such that more recent transactions end up with higher point totals than more distant transactions. Transactions occurring before a predetermined time period may be excluded altogether. For example, each transaction may be given one point. The weighting factor may be calculated based upon subtracting the time elapsed since the transaction from a predetermined base value. Once the time elapsed exceeds the base value, the transaction may be ignored. For example, if a transaction happened 20 days ago, and the predetermined value is 30 days, then the weighting factor may be 10 and the transaction score may be 1*10=10.

In some examples, each transaction may be awarded base point values based upon the type of transaction. For example, a profile view of another member (the reported or inferred location of the member whose profile is viewed may be used to infer the member's location) may be worth 1 point (which may then be multiplied by the time weighting factor), but a connection request sent to that member may be worth 10 points (which may then be multiplied by the time weighting factor). Assigning different base point values for different transaction types recognizes that different transactions have different predictive value on a member's location.

In some other examples, the score may be calculated using various machine learning algorithms. For example, a neural network with weightings for each transaction type and/or based upon the transaction age applied to various input transactions in various stages of the neural network to produce a score for a particular location. In other examples, the system may utilize a Bayesian classifier (e.g., a naïve Bayesian classifier) with weightings for each transaction type which may correspond to one or more posterior probabilities for the various signals. The training data used to train the various machine learning algorithms may come from past member transactions and manual associations between those transactions and member locations.

Figure 2:
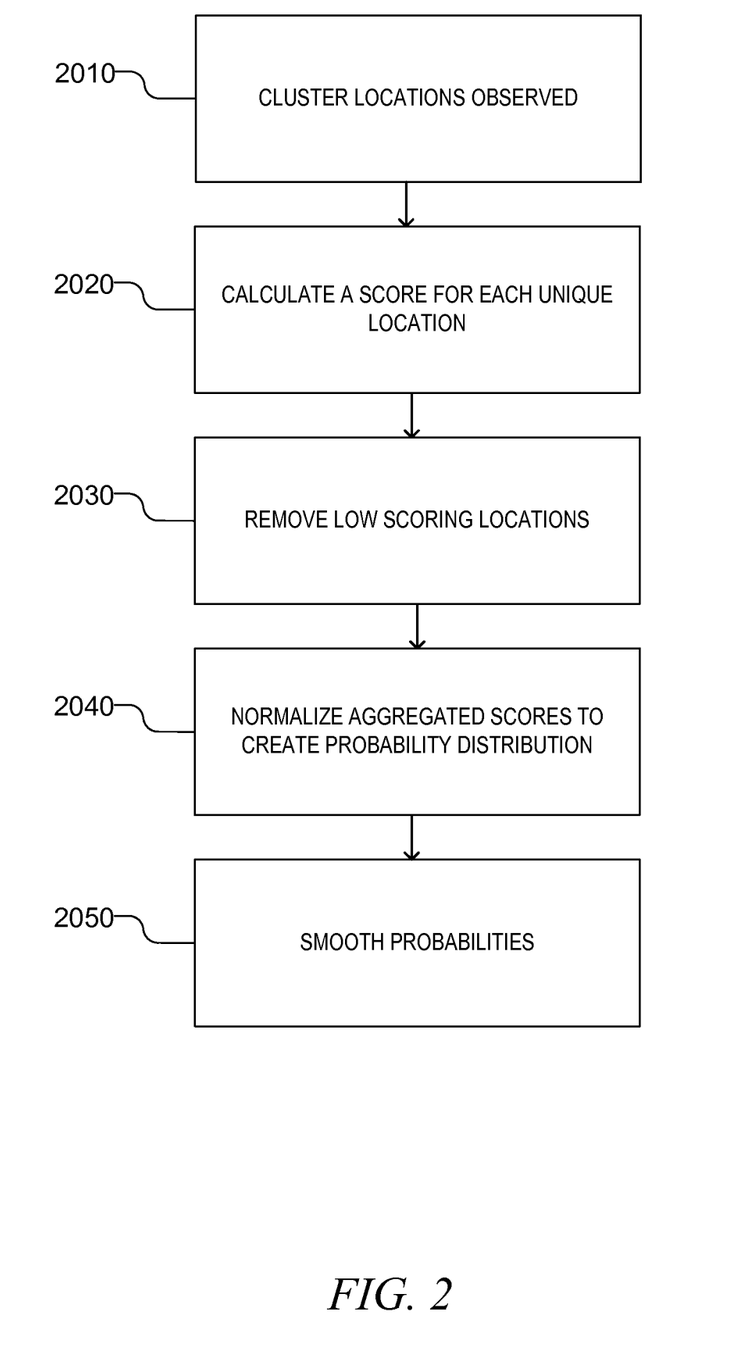
FIG. 2 shows a method of inferring a location according to some examples of the present disclosure.

Turning now to FIG. 2, once the scores are computed, each transaction may be clustered with other transactions occurring at similar locations at operation 2010. In some examples, this clustering may be done based upon determining a center point and a radius for each cluster. Clusters may be based on a number of predetermined geographical areas, territories, or other subdivisions. For example, a cluster for the city, San Francisco, may contain a center coordinate and a radius. Any transaction within the circle defined by the center coordinate and the radius may be clustered in the San Francisco cluster. In other examples, clusters may be formed by comparing the transaction data to each other, for example, forming a predetermined number of clusters filled with the transactions that are nearest each other. In yet still other examples, statistical clustering algorithms such as k-means may be utilized.

Any degree of granularity may be utilized. For example, locations in the same neighborhood in a city may be in the same cluster, locations in the same city, locations in the same county, locations in the same state, and the like. The level of granularity does not have to be constant across clusters. For example, a large city such as New York may have clusters for each of the boroughs (Manhattan, The Bronx, Brooklyn, Queens, and Staten Island), but a smaller country may have a single cluster.

At operation 2020 the scores for all the transactions in each cluster may be summed to produce an aggregate score for each cluster. At operation 2030, low scoring clusters may be removed from further analysis. For example, those clusters falling below a predetermined threshold score may be removed.

At operation 2040 the aggregated scores for the clusters may then be normalized such that they create a probability distribution which sums to one. This probability distribution indicates the probability that the particular member was at the particular location during the particular indicated timeframe. At operation 2050 the probabilities may be smoothed such that it produces a small non-zero probability that the member is in every possible cluster. For example, the smoothing may be performed by taking the centroids of clusters in the form of latitude and longitude, and fitting a bi-variate spatial model to the probabilities. The exact model may be determined by fitting a range of models and using a statistical information criterion to determine the best fitting one. A spatial smoothing model may be fit to each country or continent the member is observed in.

Figure 3:
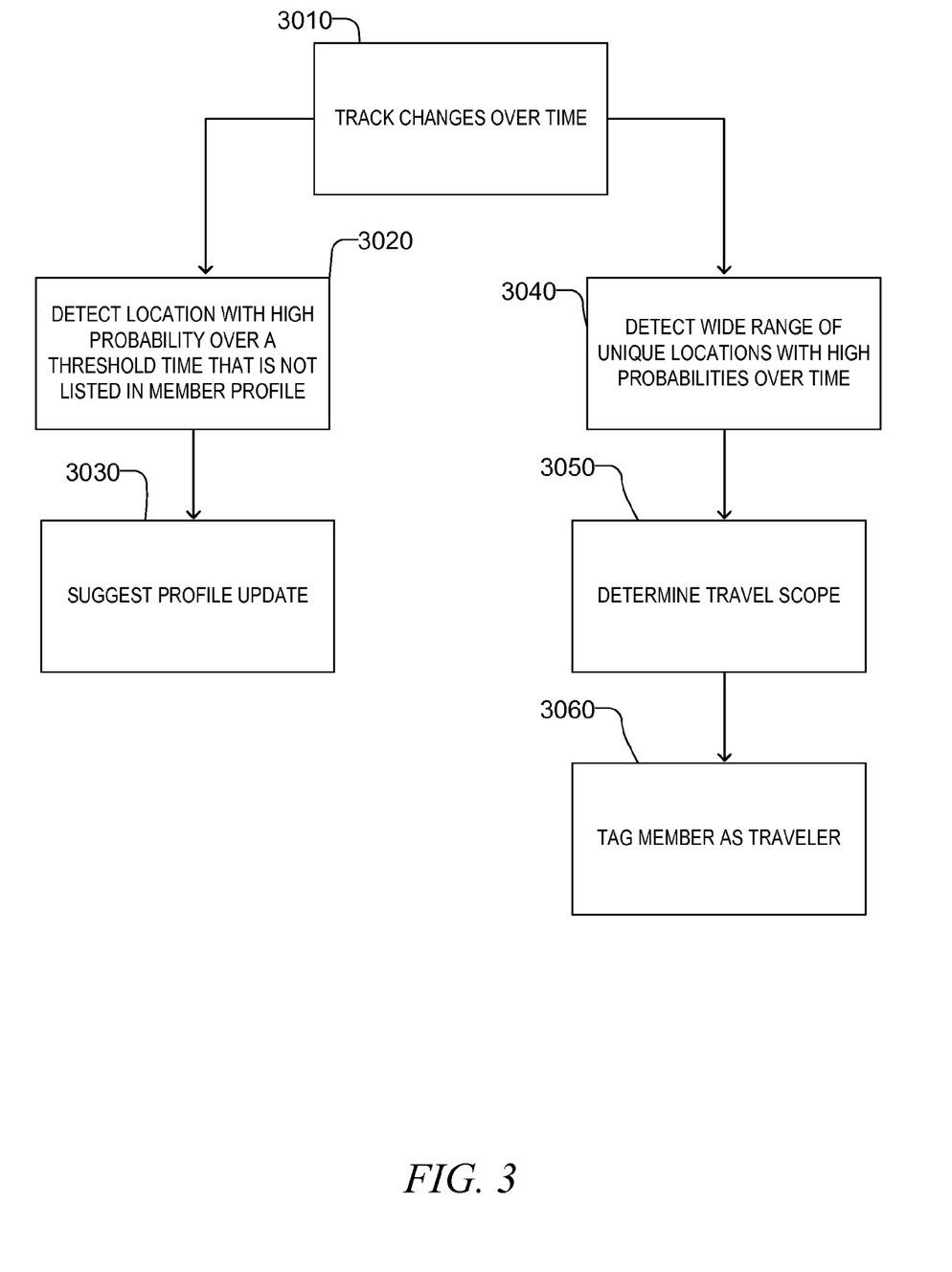
FIG. 3 shows a method of using the inferred locations according to some examples of the present disclosure.

Turning now to FIG. 3 at operation 3010 the social networking service may track these probability distributions over time to produce one or more inferences. For example, at operation 3020 the social networking service may detect a change of home or work location. For example, if the system detects for a predetermined time period that a high probability exists that the member is in a given location that is not listed as the member's home location, the system may infer that the member has moved. Consequently the social networking service may suggest a profile update at 3030. If the member does not have a home location in their member profiles, the social networking service may suggest the member add the location as their home location.

Additionally, at operation 3040, if the social networking service detects a wide range of unique locations reporting high probabilities (e.g., probablitilies exceeding some predetermined threshold level) for a predetermined threshold time period, the system may deduce that the member is a traveler. At operation 3050 the social networking system may determine a scope of travel. For example, the member may only travel within a particular region, the member may travel the country, or the member may travel the world. This determination may be based upon an average distance between different inferred locations that have high scores—e.g., the larger distances may suggest international travel, whereas shorter distances may suggest regional travel. Another technique for classifying the traveler may include determining whether the different inferred locations that have high scores are in different states, regions, countries, continents, or the like. At operation 3060, the member may be labeled or tagged with an indication that they are a traveler.

Once members are tagged as travelers, the social networking service may recommend other members with similar travel habits to connect to or follow (e.g., similar locations of travel), companies with which they may be interested in following (companies whose employees also have similar travel habits or companies which may offer services to travelers), products they may be interested in buying that appeal to travelers, jobs that may involve similar travel requirements, or the like.

Figure 4:
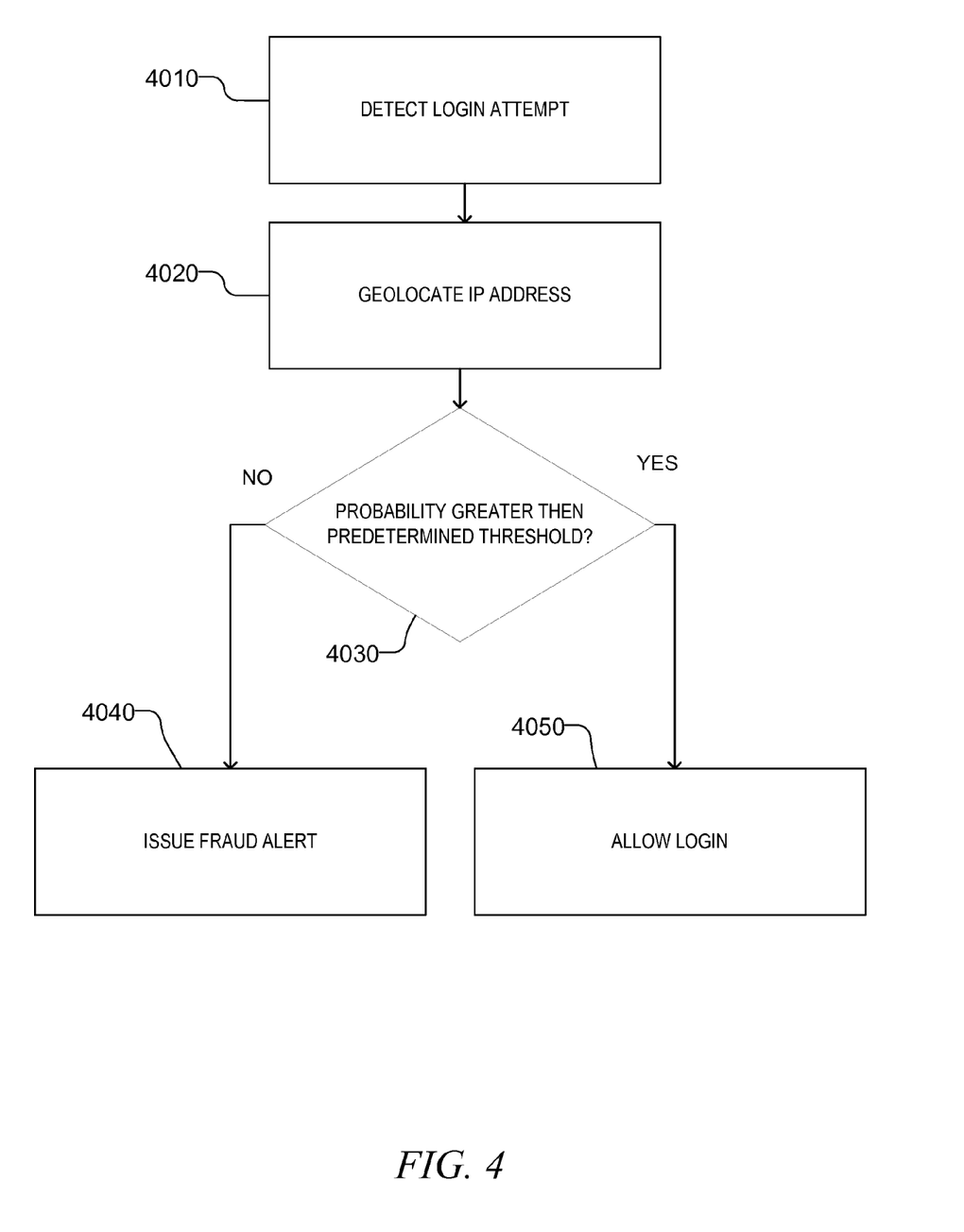
FIG. 4 shows a method of using the inferred locations according to some examples of the present disclosure.

The social networking service may also utilize the location information to flag possible fraudulent login attempts. For example an imposter may try and access a member's account. A login attempt originating from a location that the system determines to be a low probability that the member (based on the inferred location) would be located in may be flagged as suspicious. Turning now to FIG. 4, at operation 4010 a login attempt is detected. At operation 4020 the IP address may be geolocated using a database of locations corresponding to the IP address. At operation 4030 the probability of the user being in that location is compared to a particular predetermined threshold. If the probability is greater than a predetermined threshold, the login is allowed. If the probability is less than the predetermined threshold at operation 4040 a fraud alert may be issued.

Figure 5:
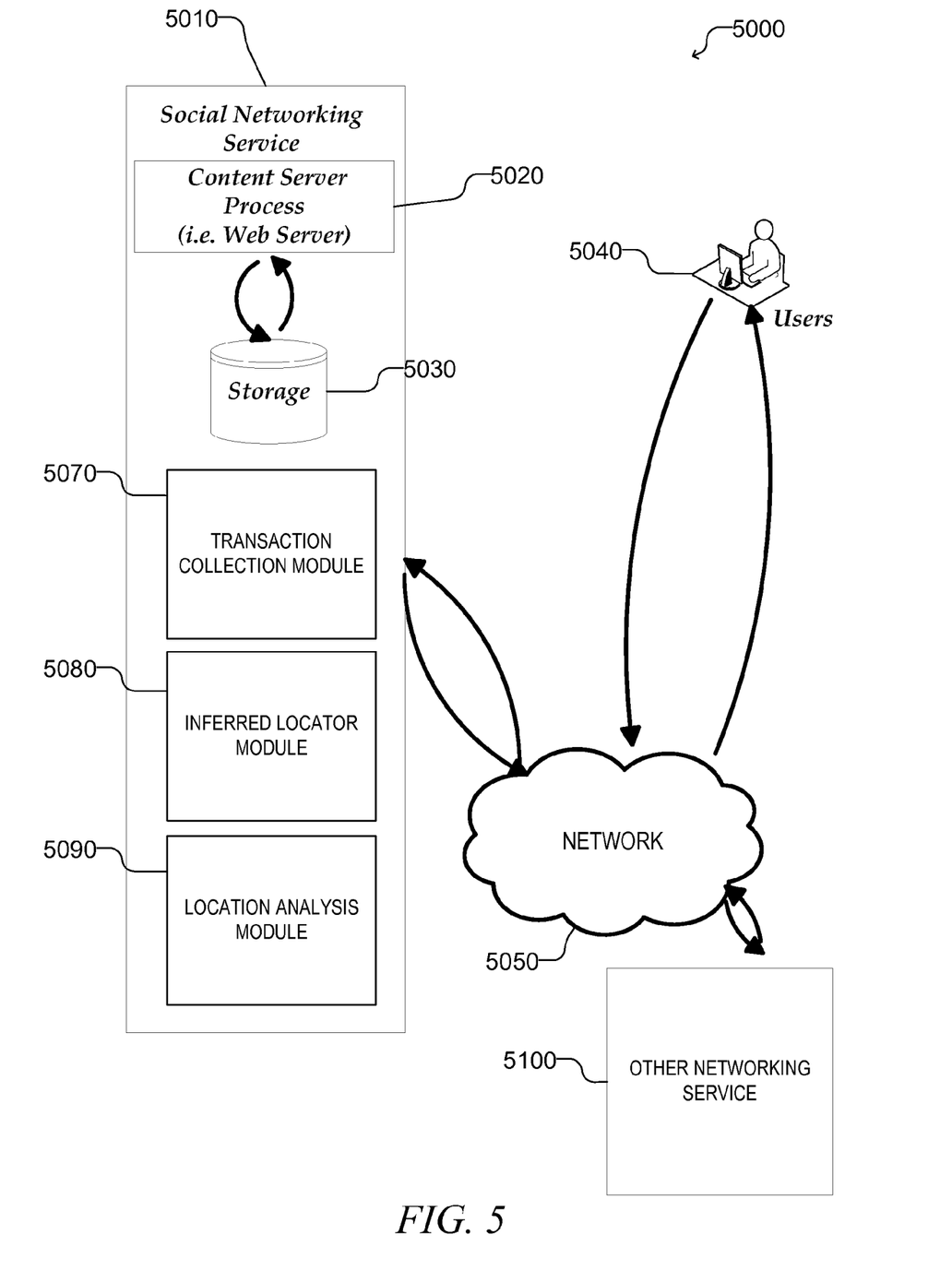
FIG. 5 shows a schematic of a social networking service according to some examples of the present disclosure.

FIG. 5 shows an example system 5000 for providing a social networking service and for providing location inference features. Social networking service 5010 may contain a content server process 5020. Content server process 5020 may communicate with storage 5030 and may communicate with one or more users 5040 through a network 5050. Content server process 5020 may be responsible for the retrieval, presentation, and maintenance of member profiles stored in storage 5030. Content server process 5020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 5040.

Users 5040 may include one or more members, prospective members, or other users of the social networking service 5040. Users 5040 access social networking service 5010 using a computing device or system through a network 5050. The network may be any means of enabling the social networking service 5010 to communicate data with users 5040. Example networks 5050 may be or include portions of: the Internet, a Local Area Network (LAN), a Wide Area Network (WAN), wireless network (such as a wireless network based upon an IEEE 802.11 family of standards), a Metropolitan Area Network (MAN), a cellular network, or the like. Computing devices used to access the social networking service may include desktop computers, laptop computers, tablet computers, mobile devices (e.g., smart phones), or the like. The users may access the social networking service through a web page served by content server process 5020 or may access the social networking service 5010 through an application executing on the computing device that may communicate with the social networking service 5010 through one or more Application Programming Interfaces (APIs).

Transaction collection module 5070 may collect transaction information related to transactions between the users 5040 and social networking service 5010. For example, when users 5040 access content server process 5020 over network 5050, the transaction collection module may collect the Internet Protocol (IP) Address of the users 5040. The transaction collection module 5070 may utilize a look up table containing IP addresses and corresponding geographic locations. Transaction collection module 5070 may collect information on other transactions between the member and the social networking service, such as connection requests, invitation acceptance, reading habits, interaction with location specific ads, and the like.

Transaction collection module 5070 may also collect information from other network services (e.g., other networking service 5100). For example, members may inform the social networking service 5010 about other networking services that contain transaction information regarding the member. The transaction collection module 5070 may periodically contact those other network services to collect transaction information about these members. Transaction collection module 5070 may utilize an application programming interface (API) to obtain the transaction information from the other networking service, or may scrape the website of the other network services. Web scraping is a software technique for extracting information from websites using such techniques as regular expression matching, data mining algorithms, Document Object Model (DOM) parsing, HTML parsers, and other algorithms. Transaction records reflecting transaction information collected about these transactions may be stored in storage 5030 for further processing.

Inferred locator module 5080 may utilize the transaction records collected by the transaction collection module 5070 stored in storage 5030 to infer geographic locations that the user may be located in. The inferred locator module 5080 may assign a predetermined number of points to each transaction (which may all be the same, or may be a different number of points based upon transaction type), and may multiply these points by a weighting factor (calculated by the inferred locator module 5080) which reduces the number of points for a transaction that is older. Each transaction record may then be clustered into similar locations and the scores of each transaction may be aggregated to form a composite score for each location. Locations below a predetermined threshold score may be ignored. The remaining scores may then be normalized and smoothed to create a probability distribution. The inferred locator module 5080 may recalculate location probabilities after a trigger event. A trigger event may include passage of a predetermined amount of time since the last location probabilities were calculated, collection of a predetermined amount of transaction records about the member since the last probabilities were calculated, collection of a predetermined transaction type, or the like.

Location analysis module 5090 may look for patterns in the probability distributions over a predetermined time period. For example, location analysis module 5090 may detect patterns indicating a member has moved. An example pattern indicating that the member has moved may be a consistently high probability that the member is in a location that is not the location they have as a home location in their member profiles. In other examples, where the member does not have a home location in their member profiles, the system may suggest that the user add a location scoring consistently high over a predetermined time period to their profile as their home location (e.g., the system may prompt the member: "do you wish to add <location> as your home location?").

Location analysis module 5090 may also look for patterns indicating travel. This may manifest in probability distributions that show a plurality of different locations with greater than minimal probabilities over time. For example, if the probability distribution calculated at time T is: San Francisco: 50%, Chicago: 30%, Seattle: 20% and at time T+1 the probability distribution is: San Francisco: 60%, New York: 20%, Minneapolis: 20%, and time interval T+2 shows probabilities: San Francisco: 30%, Omaha: 30%, Orlando: 20%, Portland: 20%. The system may determine that based on the consistently high probability of San Francisco that the member lives in San Francisco. The system may suggest the member update their profile if they do not list San Francisco as their home. The system may also determine that based upon the high probabilities that the member was in Chicago, Seattle, New York, Minneapolis, Omaha, Orlando and Portland that the member travels. Also, based upon the fact that these are all cities within the same country as the member's home, that the member is a national traveler.

The location analysis module 5090 may also determine the type of travel. For example, the system may compare the member's home location to the locations the member travels to. If the member travels outside the member's home country, they are an international traveler, if they travel only within their home country they are a national traveler, if they travel only within their home region (e.g., Western U.S, Central U.S., Eastern U.S., or the like) they are a regional traveler. In other examples, the system may determine the type of travel by utilizing an average distance between locations identified as having a more than minimal probability.

Location analysis module 5090 may cooperate with the content server process 5020 to provide customization based upon the categorization of the member as a traveler and even customization based upon the type of traveler. Location analysis module 5090 may also compare a location determined from an IP address used for a login attempt from a user 5040 to determine whether or not the login attempt is likely to be fraudulent.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing device can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
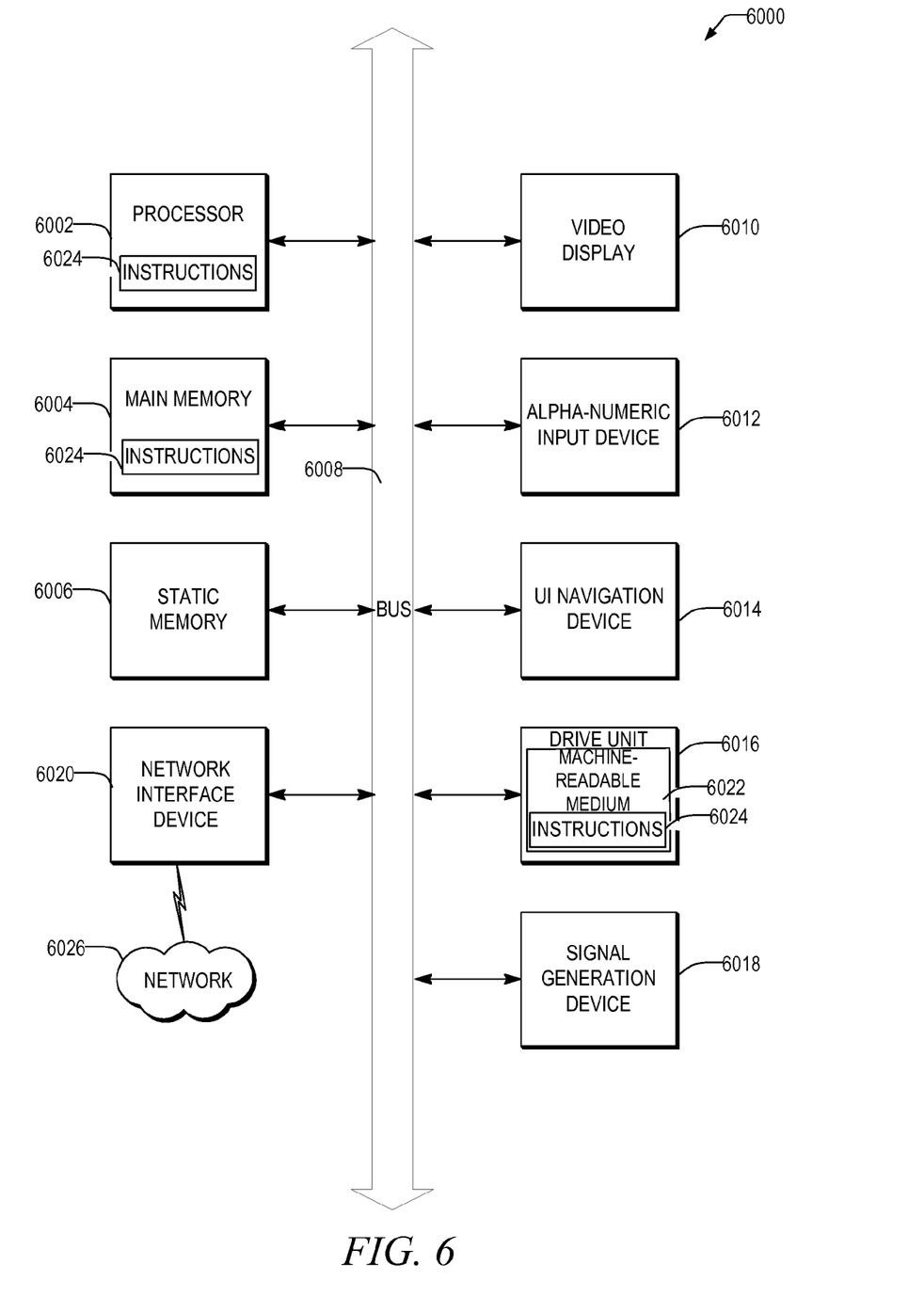
FIG. 6 shows a schematic of a machine according to some examples of the present disclosure.

FIG. 6 is a block diagram of machine in the example form of a computing device 6000 within which instructions, for causing the machine to perform any one or more of the methodologies discussed herein, may be executed. For example, any one of the components shown in FIG. 5 may be or contain one or more of the components described in FIG. 6. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 6 or only a subset of the components shown in FIG. 6.

The example computing device 6000 includes a processor 6002 (e.g., a central processing unit (CPU), a graphics processing unit (GPU) or both), a main memory 6004 and a static memory 6006, which communicate with each other via a bus 6008. The computing device 6000 may further include a video display unit 6010 (e.g., a liquid crystal display (LCD) or a cathode ray tube (CRT)). The computing device 6000 may also include an alphanumeric input device 6012 (e.g., a keyboard), a user interface (UI) navigation device 6014 (e.g., a mouse), a disk drive unit 6016, a signal generation device 6018 (e.g., a speaker) and a network interface device 6020.

Machine-Readable Medium

The disk drive unit 6016 includes a machine-readable medium 6022 on which is stored one or more sets of instructions and data structures (e.g., software) 6024 embodying or used by any one or more of the methodologies or functions described herein. The instructions 6024 may also reside, completely or at least partially, within the main memory 6004, static memory 6006, and/or within the processor 6002 during execution thereof by the computing device 6000, the main memory 6004 and the processor 6002 also constituting machine-readable media.

While the machine-readable medium 6022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 6024 may further be transmitted or received over a communications network 6026 using a transmission medium. The instructions 6024 may be transmitted using the network interface device 6020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 6020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER NOTES AND EXAMPLES

Example 1

A method comprising receiving a plurality of transaction records, each of the transaction records including data about a particular transaction engaged in by a member of a social networking service and including a geographic location and a timestamp of the particular transaction; scoring each of the plurality of transaction records based upon how recent the transaction occurred; clustering the plurality of transaction records into a plurality of clusters, each cluster including transaction records which contain similar geographic locations; creating an aggregate score for each particular one of the plurality of clusters based upon a sum total of the scores calculated for each transaction record clustered into the particular cluster; and creating a probability distribution based upon the scores for the plurality of clusters, the probability distribution indicating a probability that the member was in each of the plurality of locations represented by the clusters.

Example 2

The method of example 1, comprising: creating the probability distribution by normalizing the scores of the plurality of clusters.

Example 3

The method of any one of examples 1-2, wherein scoring each of the plurality of transaction records comprises weighting transactions which occurred recently greater than transactions that are older using a time decay algorithm.

Example 4

The method of any one of examples 1-3, wherein scoring each of the plurality of transaction records comprises giving a zero score to transactions which occurred prior to a predetermined time.

Example 5

The method of any one of examples 1-4, further comprising: determining a set of probability distributions for the member over a predetermined time period; determining that the number of unique locations with a probability greater than a predetermined threshold in the set of probability distributions exceeds a second predetermined threshold; and responsive to determining that the number of unique inferred locations exceeds the second predetermined threshold, classifying the member as a traveler.

Example 6

The method of example 5 comprising: subsequent to classifying the member as a traveler, notifying an advertiser that the member is a traveler.

Example 7

The method of any one of examples 1-6, further comprising: determining a set of probability distributions for the member over a predetermined time period; normalizing the series of inferred locations for the member; receiving a request to login to an account belonging to the member; determining a geographic location from an IP address used to make the request; determining from the set of probability distributions the probability that the member would be in the geographic location; determining that the probability that the member would be in the geographic location is less than a predetermined threshold; and responsive to determining that the probability is less than the predetermined threshold, flagging the login attempt as a fraudulent attempt.

Example 8

The method of any one of examples 1-7, comprising: determining a set of probability distributions for the member over a predetermined time period; determining that a high probability corresponding to a single location cluster is present in the set over a majority of the predetermined time period; and determining that the geographic location represented by the single location cluster is different than a location indicated in the member's profile, and in response, prompting the member to change their location in their member profile.

Example 9

A system comprising: a transaction collection module configured to receive a plurality of transaction records, each of the transaction records including data about a particular transaction engaged in by a member of a social networking service and including a geographic location and a timestamp of the particular transaction; and an inferred locator module configured to: score each of the plurality of transaction records based upon how recent the transaction occurred; cluster the plurality of transaction records into a plurality of clusters, each cluster including transaction records which contain similar geographic locations; create an aggregate score for each particular one of the plurality of clusters based upon a sum total of the scores calculated for each transaction record clustered into the particular cluster; and create a probability distribution based upon the scores for the plurality of clusters, the probability distribution indicating a probability that the member was in each of the plurality of locations represented by the clusters.

Example 10

The system of example 9, wherein the inferred locator module is configured to create the probability distribution by at least normalizing the scores of the plurality of clusters.

Example 11

The system of any one of examples 9-10, wherein the inferred locator module is configured to score each of the plurality of transaction records by at least weighting transactions which occurred recently greater than transactions that are older using a time decay algorithm.

Example 12

The system of any one of examples 9-11, wherein the inferred locator module is configured to score each of the plurality of transaction records by at least giving a zero score to transactions which occurred prior to a predetermined time.

Example 13

The system of any one of examples 9-12, further comprising: a location analysis module configured to: receive a set of probability distributions from the inferred locator module for the member over a predetermined time period; determine that the number of unique locations with a probability greater than a predetermined threshold in the set of probability distributions exceeds a second predetermined threshold; and responsive to determining that the number of unique inferred locations exceeds the second predetermined threshold, classify the member as a traveler.

Example 14

The system of example 13, wherein the location analysis module is configured to notify an advertiser that the member is a traveler subsequent to classifying the member as a traveler.

Example 15

The system of any one of examples 9-14, further comprising: a location analysis module configured to: receive a set of probability distributions from the inferred locator module for the member over a predetermined time period; normalize the series of inferred locations for the member; receive a request to login to an account belonging to the member; determine a geographic location from an IP address used to make the request; determine from the set of probability distributions the probability that the member would be in the geographic location; determine that the probability that the member would be in the geographic location is less than a predetermined threshold; and responsive to determining that the probability is less than the predetermined threshold, flag the login attempt as a fraudulent attempt.

Example 16

The system of any one of examples 9-15, comprising: a location analysis module configured to: receive a set of probability distributions from the inferred locator module for the member over a predetermined time period; determine that a high probability corresponding to a single location cluster is present in the set over a majority of the predetermined time period; and determine that the geographic location represented by the single location cluster is different than a location indicated in the member's profile, and in response, prompt the member to change their location in their member profile.

Example 17

A machine readable medium that stores instructions which when performed by a machine, cause the machine to perform operations comprising: receiving a plurality of transaction records, each of the transaction records including data about a particular transaction engaged in by a member of a social networking service and including a geographic location and a timestamp of the particular transaction; scoring each of the plurality of transaction records based upon how recent the transaction occurred; clustering the plurality of transaction records into a plurality of clusters, each cluster including transaction records which contain similar geographic locations; creating an aggregate score for each particular one of the plurality of clusters based upon a sum total of the scores calculated for each transaction record clustered into the particular cluster; and creating a probability distribution based upon the scores for the plurality of clusters, the probability distribution indicating a probability that the member was in each of the plurality of locations represented by the clusters.

Example 18

The machine readable medium of example 17, wherein the instructions for creating the probability distribution include instructions for normalizing the scores of the plurality of clusters.

Example 19

The machine readable medium of any one of examples 17-18, wherein the instructions for scoring each of the plurality of transaction records includes instructions for weighting transactions which occurred recently greater than transactions that are older using a time decay algorithm.

Example 20

The machine readable medium of any one of examples 17-19, wherein the instructions for scoring each of the plurality of transaction records includes instructions for giving a zero score to transactions which occurred prior to a predetermined time.

Example 21

The machine readable medium of any one of examples 17-20, wherein the instructions further include instructions, which when performed by the machine, cause the machine to perform the operations comprising: determining a set of probability distributions for the member over a predetermined time period; determining that the number of unique locations with a probability greater than a predetermined threshold in the set of probability distributions exceeds a second predetermined threshold; and responsive to determining that the number of unique inferred locations exceeds the second predetermined threshold, classifying the member as a traveler.

Example 22

The machine readable medium of example 21, wherein the instructions further include instructions, which when performed by the machine, cause the machine to perform the operations comprising: subsequent to classifying the member as a traveler, notifying an advertiser that the member is a traveler.

Example 23

The machine readable medium of any one of examples 17-22, wherein the instructions further include instructions, which when performed by the machine, cause the machine to perform the operations comprising: determining a set of probability distributions for the member over a predetermined time period; normalizing the series of inferred locations for the member; receiving a request to login to an account belonging to the member; determining a geographic location from an IP address used to make the request; determining from the set of probability distributions the probability that the member would be in the geographic location; determining that the probability that the member would be in the geographic location is less than a predetermined threshold; and responsive to determining that the probability is less than the predetermined threshold, flagging the login attempt as a fraudulent attempt.

Example 24

The machine readable medium of any one of examples 17-23, wherein the instructions further include instructions, which when performed by the machine, cause the machine to perform the operations comprising: determining a set of probability distributions for the member over a predetermined time period; determining that a high probability corresponding to a single location cluster is present in the set over a majority of the predetermined time period; and determining that the geographic location represented by the single location cluster is different than a location indicated in the member's profile, and in response, prompting the member to change their location in their member profile.

What is claimed is:

1. A computer-implemented method comprising:
using one or more computer processors:
receiving a plurality of transaction records, each of the transaction records including data about a particular transaction engaged in by a member of a social networking service and including a geographic location and a timestamp of the particular transaction;
scoring each of the plurality of transaction records based upon how recent the transaction occurred;
clustering the plurality of transaction records into a plurality of clusters, each cluster including transaction records which contain geographic locations that are within a predetermined geographical radius from each other;
creating an aggregate score for each particular one of the plurality of clusters based upon a sum total of the scores calculated for each transaction record clustered into the particular cluster; and
creating a probability distribution based upon the scores for the plurality of clusters, the probability distribution indicating a probability that the member was in each of the plurality of geographic locations represented by the plurality of clusters;
determining, over a predetermined period of time, that a number of unique locations with a probability greater than a predetermined probability threshold in the probability distribution exceeds a predetermined location threshold;
responsive to determining that the number of unique locations exceeds the location threshold, classifying the member as a traveler;
responsive to determining that the member is a traveler, determining a scope of travel of the member, wherein the scope of travel is one of: regional, national, or international, the determining the scope of travel of the member determined based upon an average distance between the number of unique locations with the probability greater than the probability threshold in the probability distribution; and
recommending, in a user interface, other members with a same scope of travel as the member to connect to the member or to follow companies with which they may be interested in following.

2. The method of claim 1, comprising:
creating the probability distribution by normalizing the aggregate scores of the plurality of clusters.

3. The method of claim 1, wherein scoring each of the plurality of transaction records comprises weighting transactions which occurred recently greater than transactions that are older using a time decay algorithm.

4. The method of claim 3, wherein scoring each of the plurality of transaction records comprises giving a zero score to transactions which occurred prior to a predetermined time.

5. The method of claim 1, comprising:
subsequent to classifying the member as a traveler, notifying an advertiser that the member is a traveler.

6. The method of claim 1, further comprising:
receiving a request to login to an account belonging to the member;
determining a geographic location from an IP address used to make the request;
determining from the probability distribution the probability that the member would be in the geographic location;
determining that the probability that the member would be in the geographic location is less than a predetermined security threshold; and
responsive to determining that the probability is less than the security threshold, flagging the login attempt as a fraudulent attempt.

7. The method of claim 1, comprising:
determining from the probability distribution that a probability corresponding to a single location cluster in the plurality of clusters is over a predetermined home location threshold over a majority of a predetermined time period; and
determining that the geographic location represented by the single location cluster is different than a location indicated in the member's profile, and in response, prompting the member to change their location in their member profile.

8. A system comprising:
one or more processors,
a memory coupled to the processor and including instructions, which when performed by the one or more processors, causes the system to perform the operations to:
receive a plurality of transaction records, each of the transaction records including data about a particular transaction engaged in by a member of a social networking service and including a geographic location and a timestamp of the particular transaction;
score each of the plurality of transaction records based upon how recent the transaction occurred;
cluster the plurality of transaction records into a plurality of clusters, each cluster including transaction records which contain geographic; locations that are within a predetermined geographical radius from each other;
create an aggregate score for each particular one of the plurality of clusters based upon a sum total of the scores calculated for each transaction record clustered into the particular cluster; and
create a probability distribution based upon the scores for the plurality of clusters, the probability distribution indicating a probability that the member was in each of the plurality of geographic locations represented by the plurality of clusters;
determine, over a predetermined period of time, that a number of unique locations with a probability greater than a predetermined probability threshold in the probability distribution exceeds a predetermined location threshold;
responsive to a determination that the number of unique locations exceeds the location threshold, classify the member as a traveler;
responsive to a determination that the member is a traveler, determine a scope of travel of the member, wherein the scope of travel is one of: regional, national, or international based upon an average distance between the number of unique locations with the probability greater than the probability threshold in the probability distribution; and
recommend, in a user interface, other members with a same scope of travel as the member to connect to the member or to follow companies with which they may be interested in following.

9. The system of claim 8, wherein the operations comprise operations to:
create the probability distribution by at least normalizing the aggregate scores of the plurality of clusters.

10. The system of claim 8, wherein the operations comprise operations to: score each of the plurality of transaction records by at least weighting transactions which occurred recently greater than transactions that are older using a time decay algorithm.

11. The system of claim 10, wherein operations comprise operations to: score each of the plurality of transaction records by at least giving a zero score to transactions which occurred prior to a predetermined time.

12. The system of claim 8, wherein the operations comprise operations to notify an advertiser that the member is a traveler subsequent to classifying the member as a traveler.

13. The system of claim 8, wherein the operations comprise operations to:
receive a request to login to an account belonging to the member;
determine a geographic location from an IP address used to make the request;
determine from the probability distribution the probability that the member would be in the geographic location;
determine that the probability that the member would be in the geographic location is less than a predetermined security threshold; and
responsive to determining that the probability is less than the security threshold, flag the login attempt as a fraudulent attempt.

14. The system of claim 8, wherein the operations comprise operations to:
determine from the probability distribution that a probability corresponding to a single location cluster in the plurality of clusters is over a predetermined home location threshold over a majority of the predetermined time period; and
determine that the geographic location represented by the single location cluster is different than a location indicated in the member's profile, and in response, prompt the member to change their location in their member profile.

15. A non-transitory machine readable medium that stores instructions which when performed by a machine, cause the machine to perform operations comprising:
receiving a plurality of transaction records, each of the transaction records including data about a particular transaction engaged in by a member of a social networking service and including a geographic location and a timestamp of the particular transaction;
scoring each of the plurality of transaction records based upon how recent the transaction occurred;

clustering the plurality of transaction records into a plurality of clusters, each cluster including transaction records which contain geographic locations that are within a predetermined geographical radius from each other;

creating an aggregate score for each particular one of the plurality of clusters based upon a sum total of the scores calculated for each transaction record clustered into the particular cluster; and creating a probability distribution based upon the scores for the plurality of clusters, the probability distribution indicating a probability that the member was in each of the plurality of geographic locations represented by the plurality of clusters;

determining, over a predetermined period of time, that a number of unique locations with a probability greater than a predetermined probability threshold in the probability distribution exceeds a predetermined location threshold;

responsive to determining that the number of unique locations exceeds the location threshold, classifying the member as a traveler;

responsive to determining that the member is a traveler, determining a scope of travel of the member, wherein the scope of travel is one of: regional, national, or international, the determining the scope of travel of the member determined based upon an average distance between the number of unique locations with the probability greater than the probability threshold in the probability distribution; and recommending, in a user interface, other members with a same scope of travel as the member to connect to the member or to follow companies with which they may be interested in following.

16. The machine readable medium of claim 15, wherein the instructions for creating the probability distribution include instructions for normalizing the aggregate scores of the plurality of clusters.

17. The machine readable medium of claim 15, wherein the instructions for scoring each of the plurality of transaction records includes instructions for weighting transactions which occurred recently greater than transactions that are older using a time decay algorithm.

18. The machine readable medium of claim 17, wherein the instructions for scoring each of the plurality of transaction records includes instructions for giving a zero score to transactions which occurred prior to a predetermined time.

19. The machine readable medium of claim 15, wherein the instructions further include instructions, which when performed by the machine, cause the machine to perform the operations comprising:

subsequent to classifying the member as a traveler, notifying an advertiser that the member is a traveler.

20. The machine readable medium of claim 15, wherein the instructions further include instructions, which when performed by the machine, cause the machine to perform the operations comprising:

receiving a request to login to an account belonging to the member;

determining a geographic location from an IP address used to make the request;

determining from the probability distribution the probability that the member would be in the geographic location;

determining that the probability that the member would be in the geographic location is less than a predetermined security threshold; and responsive to determining that the probability is less than the security threshold, flagging the login attempt as a fraudulent attempt.

21. The machine readable medium of claim 15, wherein the instructions further include instructions, which when performed by the machine, cause the machine to perform the operations comprising:

determining from the probability distribution that a probability corresponding to a single location cluster in the plurality of clusters is over a predetermined home location threshold over a majority of a predetermined time period; and determining that the geographic location represented by the single location cluster is different than a location indicated in the member's profile, and in response, prompting the member to change their location in their member profile.

* * * * *

UNITED STATES PATENT AND TRADEMARK OFFICE
CERTIFICATE OF CORRECTION

PATENT NO. : 9,635,116 B2
APPLICATION NO. : 13/871570
DATED : April 25, 2017
INVENTOR(S) : Anand et al.

Page 1 of 1

It is certified that error appears in the above-identified patent and that said Letters Patent is hereby corrected as shown below:

In the Claims

In Column 19, Line 52, in Claim 8, delete "geographic;" and insert --geographic-- therefor Signed and Sealed this
Fifth Day of May, 2020

Andrei Iancu
*Director of the United States Patent and Trademark Office*